(12) United States Patent
Weatherford

(10) Patent No.: US 7,168,906 B2
(45) Date of Patent: Jan. 30, 2007

(54) POLICE CAR VEHICLE RESTRAINT

(76) Inventor: Syd Weatherford, 512 Craddock Ave., San Marcos, TX (US) 78666

( * ) Notice: Subject to any disclaimer, the term of this patent is extended or adjusted under 35 U.S.C. 154(b) by 466 days.

(21) Appl. No.: 10/655,139

(22) Filed: Sep. 4, 2003

(65) Prior Publication Data

US 2005/0052012 A1    Mar. 10, 2005

(51) Int. Cl.
*B66D 1/36* (2006.01)
(52) U.S. Cl. ................. 414/462; 280/762
(58) Field of Classification Search ......... 414/462; 280/762, 491.5; 187/249; 180/287
See application file for complete search history.

(56) References Cited

U.S. PATENT DOCUMENTS

| | | | |
|---|---|---|---|
| 2,157,612 A | 5/1939 | Kirk | 294/110 |
| 2,194,623 A | 3/1940 | Thompson | 280/33.15 |
| 2,625,278 A | 1/1953 | Sensenbaug | 214/86 |
| 4,204,702 A * | 5/1980 | Oltrogge | 280/491.5 |
| 5,297,921 A | 3/1994 | Springer et al. | 414/401 |
| 5,839,759 A | 11/1998 | Trigo | 280/762 |
| 5,845,356 A * | 12/1998 | Kielinski | 14/69.5 |
| 5,893,553 A * | 4/1999 | Pinkous | 269/249 |
| 6,176,519 B1 | 1/2001 | Limingoja | 280/762 |
| 6,224,317 B1 * | 5/2001 | Kann et al. | 414/408 |

* cited by examiner

*Primary Examiner*—Patrick Mackey
*Assistant Examiner*—Charles A. Fox
(74) *Attorney, Agent, or Firm*—Derek R. Van Gilder

(57) ABSTRACT

A police-car vehicle restraint has a pair of lift hooks with lift arms (7) having rigid hooks (5) outwardly from flat spring sections (50) which are attached pivotally to front ends of a chassis of a police car (10) for being pivoted selectively or simultaneously intermediate proximate verticality and horizontality. Swivel pads (22) can be positioned on the rigid hooks.

19 Claims, 8 Drawing Sheets

POLICE CAR VEHICLE RESTRAINT

BACKGROUND OF THE INVENTION

1. Field of the Invention

This invention relates to a vehicle restraint for use on a front of a police car to hook an aft end of a vehicle that is fleeing or that is likely to flee from police detention.

2. Relation to Prior Art

There are known vehicle restrainers for use on fronts of police cars to restrain vehicles fleeing or likely to flee from police detention, but not with a pair of independently operable lift hooks that are attachable quickly and easily to fronts of police cars for lifting rear wheels of a fleeing vehicle by lifting its aft end in a manner taught by this invention.

Listed below for consideration is known related prior art:

| Number | Date | Inventor | U.S. Class |
| --- | --- | --- | --- |
| U.S. Pat. No. 6,176,519 B1 | 1/2001 | Limingoja | 280/762 |
| U.S. Pat. No. 5,839,759 | 11/1998 | Trigo | 280/762 |
| U.S. Pat. No. 5,297,921 | 3/1994 | Springer et al | 414/401 |
| U.S. Pat. No. 2,625,278 | 1/1953 | Sensenbaugh | 214/86 |
| U.S. Pat. No. 2,194,623 | 3/1940 | Thompson | 280/33.15 |
| U.S. Pat. No. 2,157,612 | 5/1939 | Kirk | 294/110 |

The above Limingoja patent, No. 6,176,519 B1, describes pierce-hooking fleeing vehicles. The other above known related prior art is made for grabbing car bumpers which present cars do not have. For capturing cars without bumpers, the above Trigo patent, No. 5,839,759, describes a chase vehicle with an upwardly projecting hook capable of entrapping portions of the undercarriage of the fleeing vehicle. Cars without bumpers, however, also generally do not have undercarriage portions that are reliably capable of resisting tension of chase-vehicle braking in opposition to pulling pressure of the fleeing vehicle.

A problem of apprehending present vehicles without bumpers still exists.

SUMMARY OF THE INVENTION

Objects of patentable novelty and utility taught by this invention are to provide a police-car vehicle restraint which:

can lift the rear wheels of a fleeing vehicle by lifting its rear end for overcoming pulling tension in opposition to restraint capacity of aft ends of cars with hooks;

can lift against possibly differing heights of bottom portions of fleeing target vehicles;

prevents steerability and effective escape of targeted vehicles with front-wheel drive by hooking onto and lifting their aft ends for lifting their rear wheels from a traction surface;

can be attached quickly, easily an inexpensively to chassis structure of police cars without professional skills; and can safely resist possible unanticipated stopping of the fleeing target vehicle.

This invention accomplishes these and other objectives with a police-car vehicle restraint having a pair of separately operable lift hooks that are predeterminedly spring-attached pivotally to front ends of a chassis of a police car for being pivoted intermediate proximate verticality and proximate horizontality. A first lift hook is attached pivotally to a front of a first chassis beam with a first pivotal attachment. A second lift hook is attached pivotally to a front of a second chassis beam with a second pivotal attachment. A first pivot motor is in pivotal communication with the first lift hook. A second pivot motor is in pivotal communication with the second lift hook. The first pivot motor has pivotal power and the first pivotal attachment has pivotal support capacity for lifting a predetermined car weight on a lift-hook end of the first lift hook. The second pivot motor has pivotal power and the second pivotal attachment has pivotal support capacity for lifting a predetermined car weight on a lift-hook end of the second lift hook. The lift-hook end of the first lift hook is extended predeterminedly orthogonal and towards the first pivotal attachment. The lift-hook end of the second lift hook is extended predeterminedly orthogonal and towards the second pivotal attachment. A swivel pad is attached to the lift-hook end of the first lift hook and to the lift-hook end of the second lift hook. The first lift motor and the second lift motor have controls proximate easy view and reach of an operator inside of the police car to which the pair of separately operable lift hooks are attached pivotally.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Figure 1:
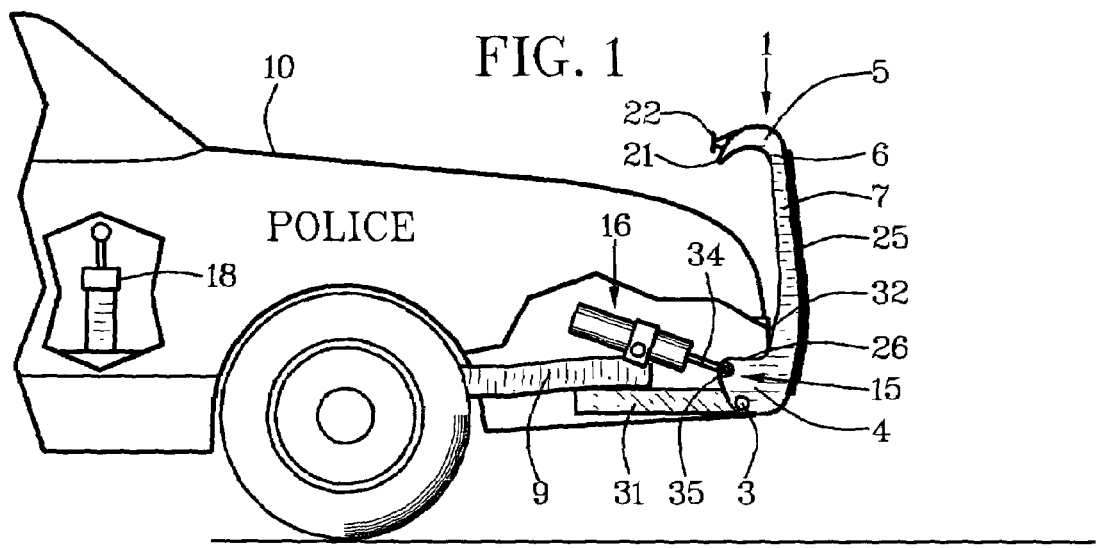
FIG. 1 is a partially cutaway front-side view of a police car on which a pneumatic embodiment of the police-car vehicle restraint is positioned with lift hooks in a vertical non-use mode.
Figure 2:
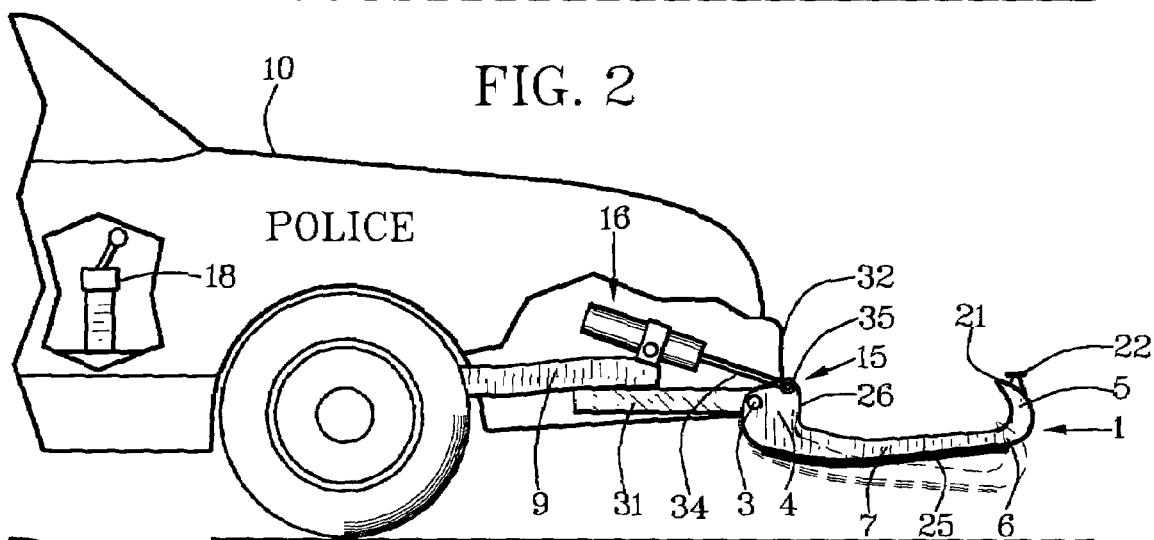
FIG. 2 is the FIG. 1 illustration with the lift hooks in a horizontally ready mode.
Figure 3:
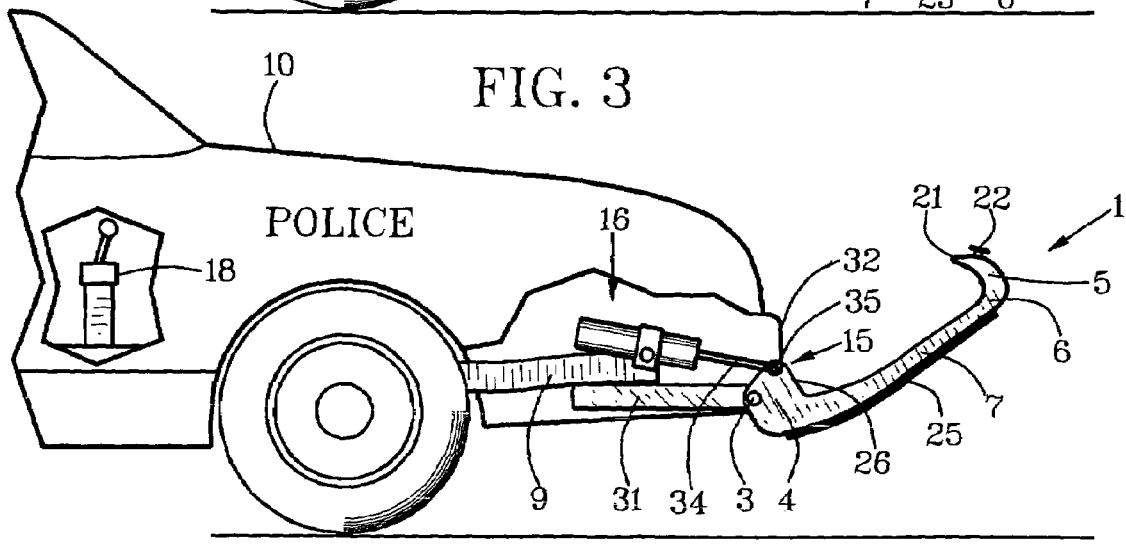
FIG. 3 is the FIG. 1 illustration with the lift hooks in a slanted lifting or transitional mode.
Figure 4:
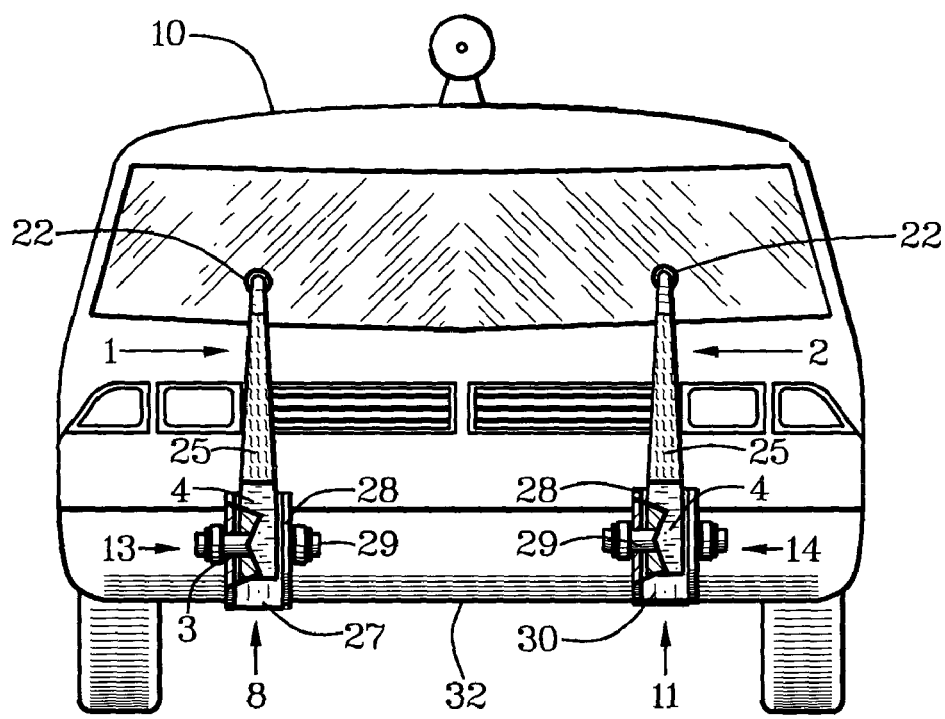
FIG. 4 is a front view of the police car with the lift hooks in the non-use mode.
Figure 5:
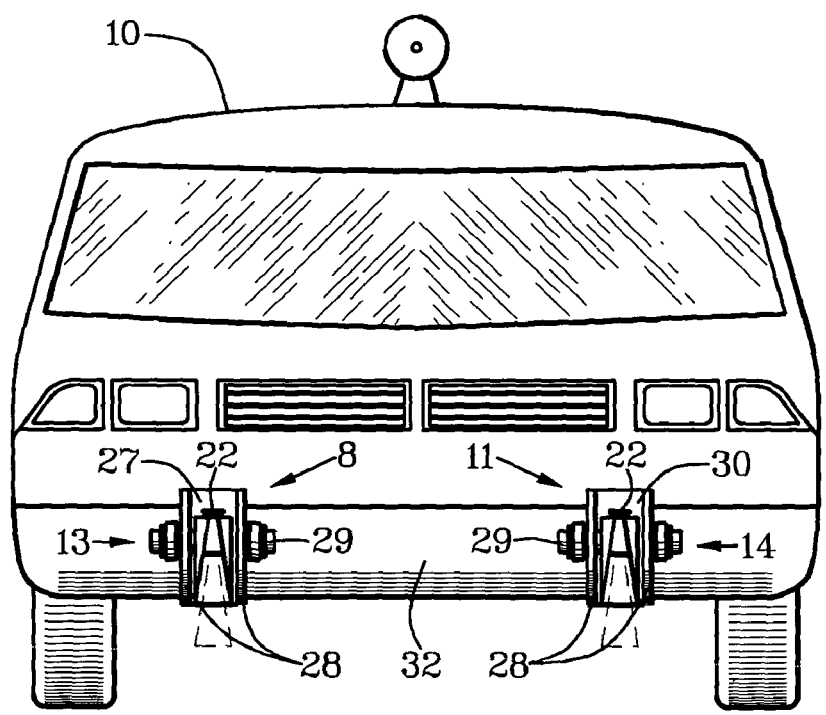
FIG. 5 is a front view of the police car with the lift hooks in the horizontally ready mode.
Figure 6:
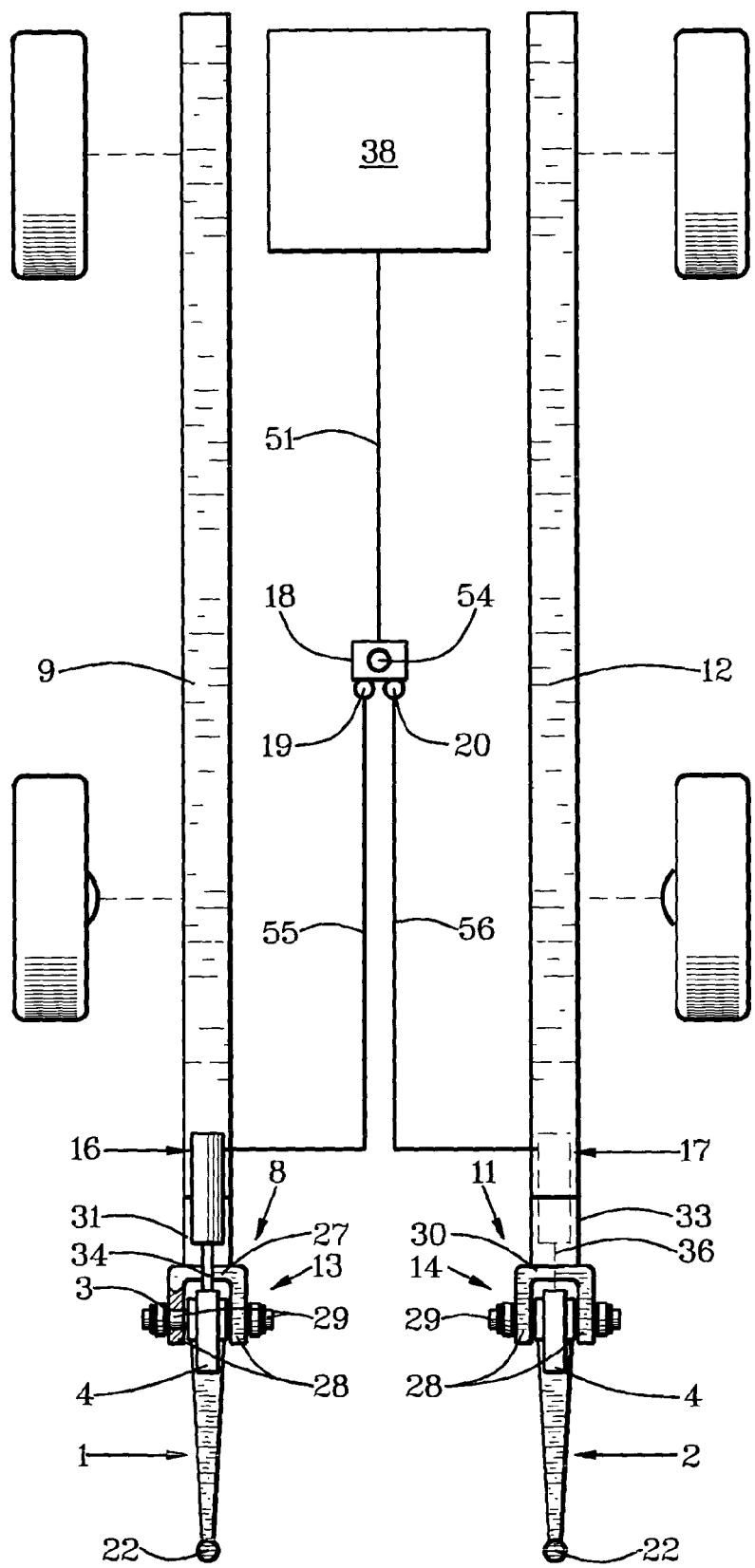
FIG. 6 is a top layout drawing of a chassis portion of a police car with the lift hooks in the horizontally ready mode.
Figure 7:
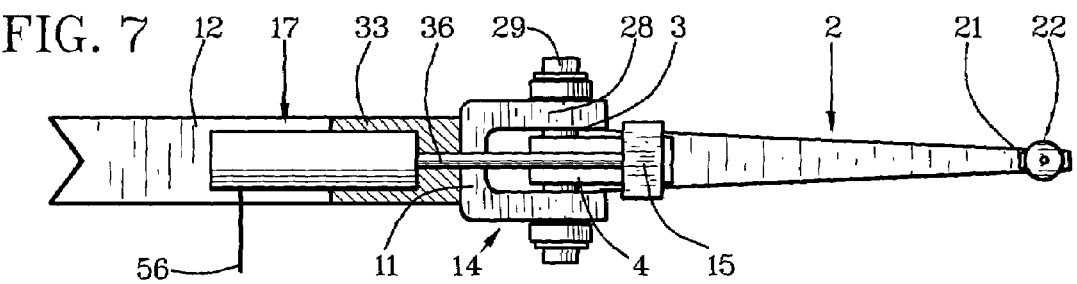
FIG. 7 is a fragmentary top view of a left portion of a pneumatic embodiment attached to a chassis beam and having a second lift hook in a horizontally ready mode.
Figure 8:
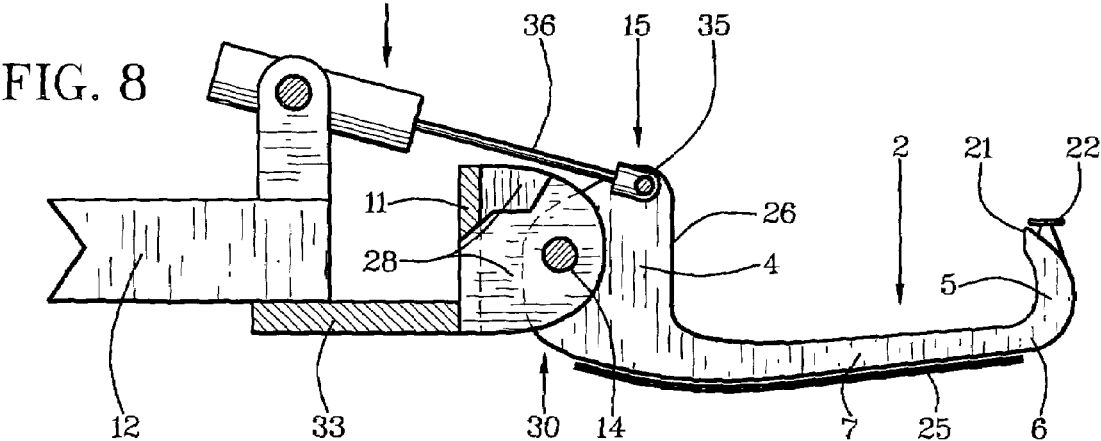
FIG. 8 is a partially side view of the FIG. 7 illustration.
Figure 9:
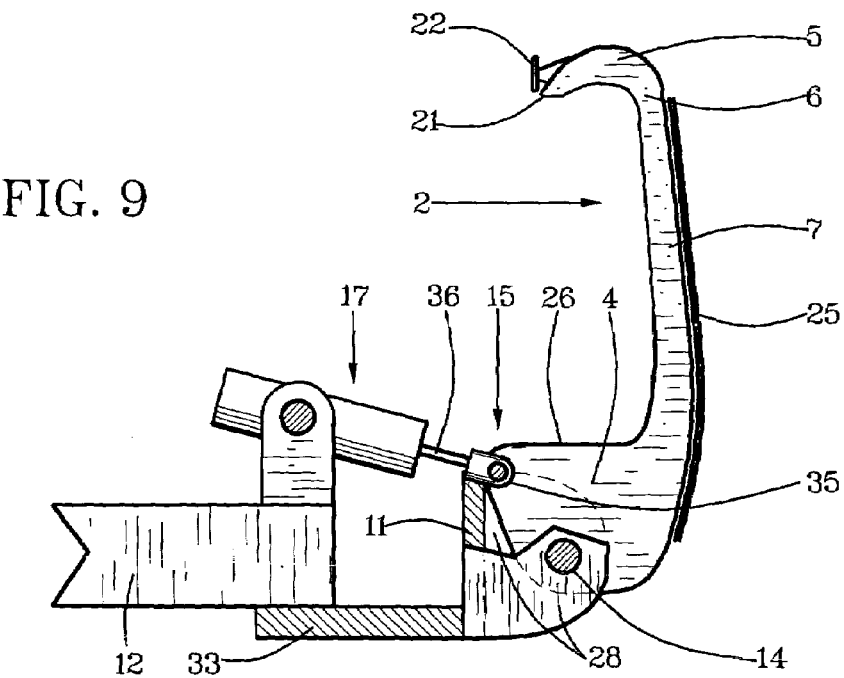
FIG. 9 is a partially cutaway side view of the FIG. 7 illustration with the lift hook in the vertical non-use mode.

Listed numerically below with reference to the drawings are terms used to describe features of this invention. These terms and numbers assigned to them designate the same features throughout this description.

1. First lift hook
2. Second lift hook
3. Pivotal attachment
4. Pivot end
5. Hook
6. Hook end
7. Lift arm
8. First chassis attachment
9. First chassis beam
10. Police car
11. Second chassis attachment
12. Second chassis beam
13. First pivotal connection
14. Second pivotal connection
15. Pivot transmission
16. First pivot motor
17. Second pivot motor
18. Control panel
19. First controller
20. Second controller
21. Lift surface
22. Swivel pad
23. Bottom
24. Target vehicle
25. Push pad
26. Impact edge
27. First attachment housing
28. Side walls
29. Pivot axle
30. Second attachment housing
31. First attachment rod
32. Bumper wall
33. Second attachment rod
34. First control rod
35. Lever connection
36. Second control rod
37. First pneumatic motor
38. Air pressurizer
39. Second pneumatic motor
40. First hydraulic motor
41. Fluid pressurizer
42. Second hydraulic motor
43. First screw motor
44. Screw shaft
45. Second screw motor
46. First pinion motor
47. Rack shaft
48. Second pinion motor
49. Second pneumatic valve -continued 50. Flat-spring section
51. Air tube
52. Pneumatic distributor
53. Pneumatic joy stick
54. First pneumatic valve
55. First pneumatic line
56. Second pneumatic line
57. Fluid tube
58. Hydraulic distributor
59. Hydraulic joy stick
60. First hydraulic valve
61. First hydraulic line
62. Second hydraulic line
63. Power source
64. Electrical source line
65. Electrical distributor
66. Electrical joy stick
67. First resistance switch
68. First electrical line
69. Second electrical line
70. Rear wheels
71. Traction surface
72. Second hydraulic valve
73. Second resistance switch Referring to FIGS. 1–9, a police-car vehicle restraint has a pair of two separately operable lift hooks spring-attached pivotally to a front end of a chassis of a police car for being pivoted to proximate verticality for a non-use mode, to proximate horizontality for a use-preparation mode and towards verticality for a use mode selectively. The pair of two separately operable lift hooks include a first lift hook 1 and a second lift hook 2 which each have a pivotal attachment 3 on a pivot end 4, a hook 5 on a hook end 6 and a lift arm 7 intermediate proximate the pivot end 4 and the hook end 6.

For attaching the pair of two separably operable lift hooks to the police car, first chassis attachment 8 is attachable predeterminedly to proximate a front end of a first chassis beam 9 of a chassis of the police car 10 and a second chassis attachment 11 is attachable predeterminedly to proximate a front end of a second chassis beam 12 of a chassis of the police car 10. Standard U-bolts, bracket bolts, J-bolts, adaptor plates, polymer bushings, beam supports, customized adaptors and other fastener items can be employed for attachment to constantly changing and differing chassis construction.

The pivotal attachment 3 on the first lift hook 1 and the first chassis attachment 8 have a predetermined first pivotal connection 13 and correspondingly, the pivotal attachment 3 on the second lift hook 2 and the second chassis attachment 11 have a predetermined second pivotal connection 14.

The pivot end 4 of the of the first lift hook 1 has a pivot transmission 15 that is geared to a first pivot motor 16 and correspondingly, the pivot end 4 of the of the second lift hook 2 has the pivot transmission 15 that is geared to a second pivot motor 17.

A control panel 18 is attachable to an interior portion of the police car 10 for convenient view and access by an operator in the police car 10. The control panel 18 has a first controller 19 for control communication with the first pivot motor 16 and a second controller 20 for control communication with the second pivot motor 17 selectively and simultaneously.

The first pivot motor 16 and the second pivot motor 17 each have power that is transmittable intermediate the pivot transmission 15 and the hook end 6 of the first lift hook 1 and the second lift hook 2 for lifting a predetermined vehicle weight on the hook 5 of the first lift hook 1 and the second lift hook 2 by pivoting of the first lift hook 1 and pivoting the second lift hook 2 intermediate proximate horizontality and verticality selectively or simultaneously through the first controller 19 and the second controller 20 on the control panel 18.

Figure 23:
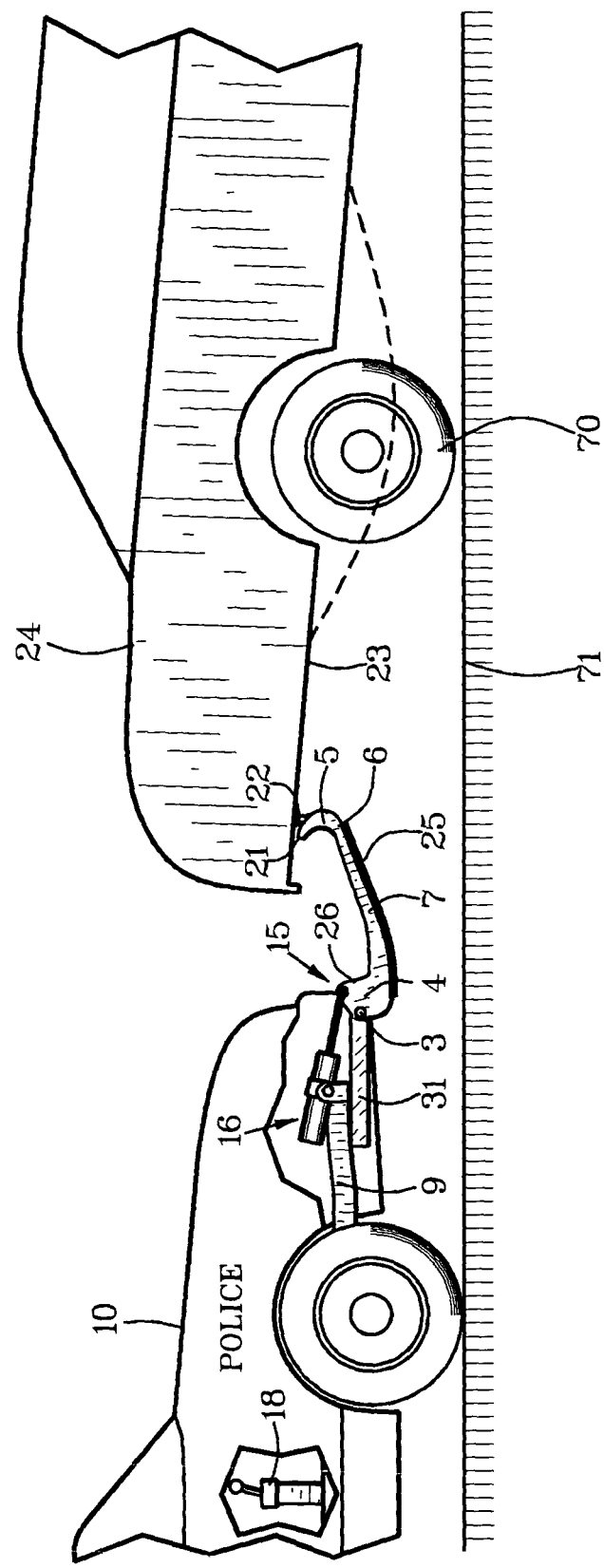
FIG. 23 is a partially cutaway side view of the police car lift-capturing a target vehicle having rear wheels lifted off of traction contact with a traction surface.

A lift surface 21 is provided on the hook 5 of the first lift hook 1 and the second lift hook 2. The lift surface 21 preferably includes a swivel pad 22 that is pivotal universally within predetermined limits for adjusting automatically to changeable orientation of a bottom 23 of a target vehicle 24, as shown in FIG. 23, in relationship to changeable orientation of the hook 5 of the first lift hook 1 and the second lift hook 2 that is caused to engage the bottom 23 of the target vehicle 24 by upward pivotal travel of the first lift hook 1 and the second lift hook 2 with pivotal action controlled with the first controller 19 and the second controller 20 selectively or simultaneously.

Preferably, the lift arm 7 of the first lift hook 1 and lift arm 7 of the second lift hook 2 each include a push pad 25 on a side opposite the hook 5 for being positioned vertically in front of the police car 10 for pushing vehicles and for absorbing impact shock with the first lift hook 1 and the second lift hook 2 being oriented vertically in the non-use mode.

The first lift hook 1 and the second lift hook 2 each include an impact edge 26 that is oriented orthogonally to axes of the lift arm 7 on a hook side of the pivot attachment 3 for absorbing impact of rearward travel of the target vehicle 24 from unanticipated slowing of speed and quick stopping of the target vehicle 24.

The first chassis attachment 8 can include a first attachment housing 27 having side walls 28 for housing a pivot axle 29 of the first pivotal connection 13. Correspondingly, the second chassis attachment 12 can include a second attachment housing 30 having the side walls 28 for housing the pivot axle 29 of the second pivotal connection 14. The first attachment housing 27 is attachable to the first chassis beam 9 with a first attachment rod 31 that is extended rearwardly from the first attachment housing 27 and attached to the first chassis beam 9 aft of a first side of a bumper wall 32. The second attachment housing 30 is attachable to the second chassis beam 12 with a second attachment rod 33 that is extended rearwardly from the second attachment housing 30 and attached to the second chassis beam 12 aft of a second side of the bumper wall 32.

The pivot transmission 15 can include a first control rod 34 that is attached pivotally to a lever connection 35 that is offset from the first pivotal connection 13. The pivot transmission 15 can include a second control rod 36 that is attached pivotally to the lever connection 35 that is offset from the second pivotal connection 14. The first control rod 34 is attached predeterminedly to the first pivot motor 16 that is anchored to the police car 10 proximate the first chassis beam 9 for controlling distance of the lever connection 35 from the first pivot motor 16 and the second control rod 36 is attached predeterminedly to the second pivot motor 17 that is anchored to the police car 10 proximate the second chassis beam 12 for controlling distance of the lever connection 35 from the second pivot motor 17 for thereby actuating the first lift hook 1 and the second lift hook 2 intermediate proximate verticality and horizontality selectively and simultaneously from the control panel 18.

A support rod can be provided on the first chassis beam 9 and on the second chassis beam 11 for providing additional beam strength for lifting heavy loads with the front of the police car 10.

Referring to FIGS. 18–23, the lift arm 7 of the first lift hook 1 and of the second lift hook 2 each can include a flat-spring section 50 proximate the pivot end 4 for sustaining lifting force of the hook 5 against a bottom 23 of an aft portion of the target vehicle 24 and for providing shock absorbency against frontal impact with the first lift hook 1 and the second lift hook 2 being in a vertical non-lifting mode. Additionally, the lift arm 7 towards the hook end 6 can include the push pad 25 and I-beam structure for hook rigidity and for lift rigidity.

Figure 10:
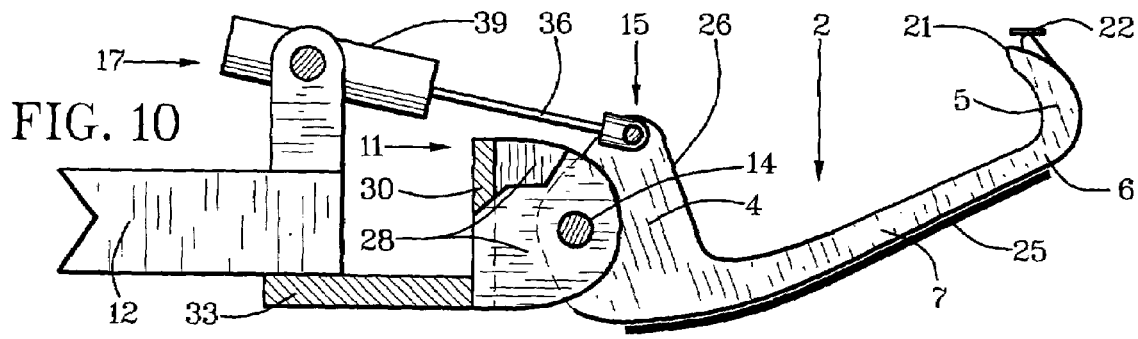
FIG. 10 is a partially cutaway fragmentary side view of a left portion of the pneumatic embodiment attached to a chassis beam and having the second lift hook in a lifting or transitional mode.
Figure 12:
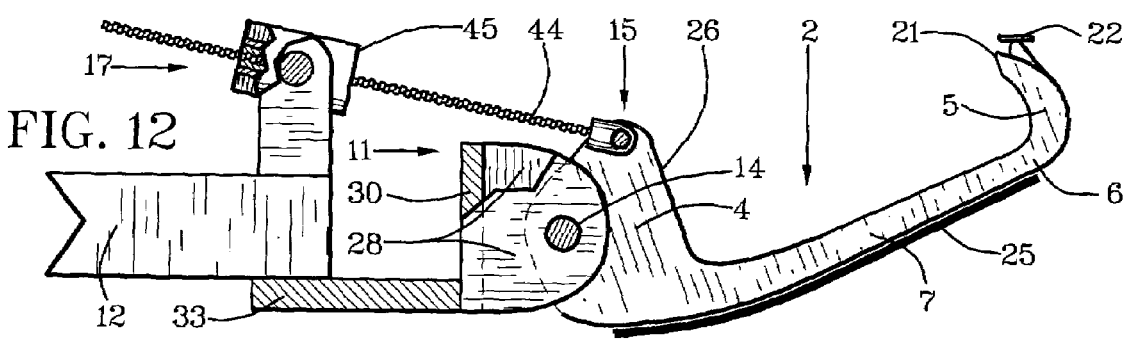
FIG. 12 is a partially cutaway fragmentary side view of a left portion of a screw-motor embodiment attached to a chassis beam and having the second lift hook in the lifting or transitional mode.
Figure 13:
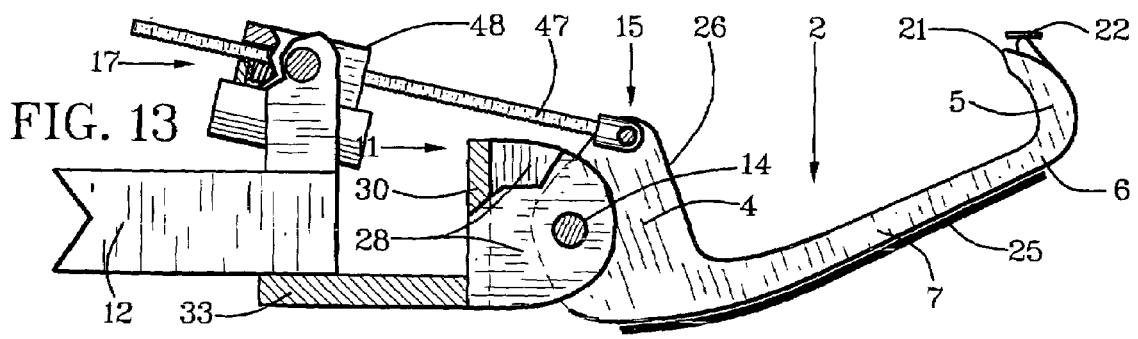
FIG. 13 is a partially cutaway fragmentary side view of a left portion of a pinion-rack embodiment attached to a chassis beam and having the second lift hook in the lifting or transitional mode.
Figure 14:
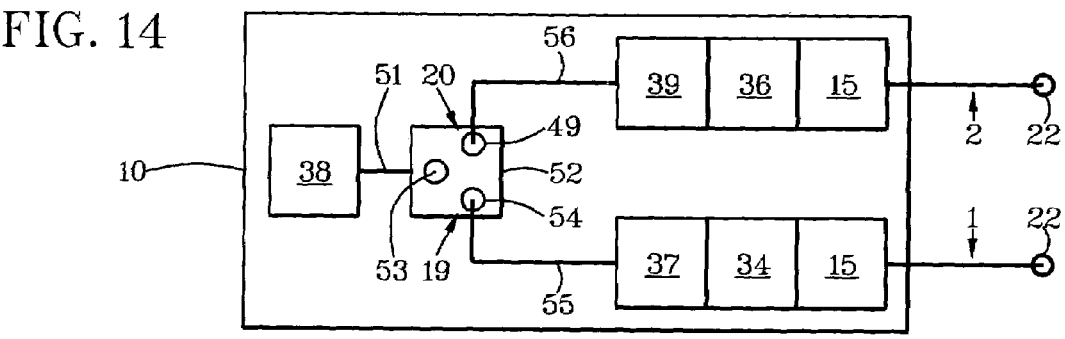
FIG. 14 is a schematic diagram of the pneumatic embodiment.

Referring to FIGS. 10–17 and referring further to FIGS. 1–9, the first pivot motor 16 can include a first pneumatic motor 37 having an air pressurizer 38 on the police car 10. The second pivot motor 17 can include a second pneumatic motor 39 having the air pressurizer 38 on the police car 10. The air pressurizer 38 includes pressure controllability for the first pneumatic motor 37 with the first controller 19. Correspondingly, the air pressurizer 38 includes pressure controllability for the second pneumatic motor 39 with the second controller 20 selectively as shown in FIGS. 10 and 14.

Figure 11:
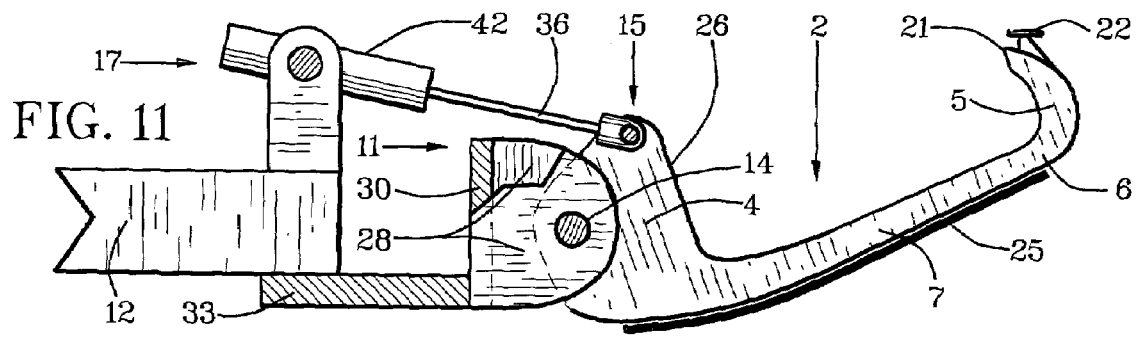
FIG. 11 is a partially cutaway fragmentary side view of a left portion of a hydraulic embodiment attached to a chassis beam and having the second lift hook in the lifting or transitional mode.
Figure 15:
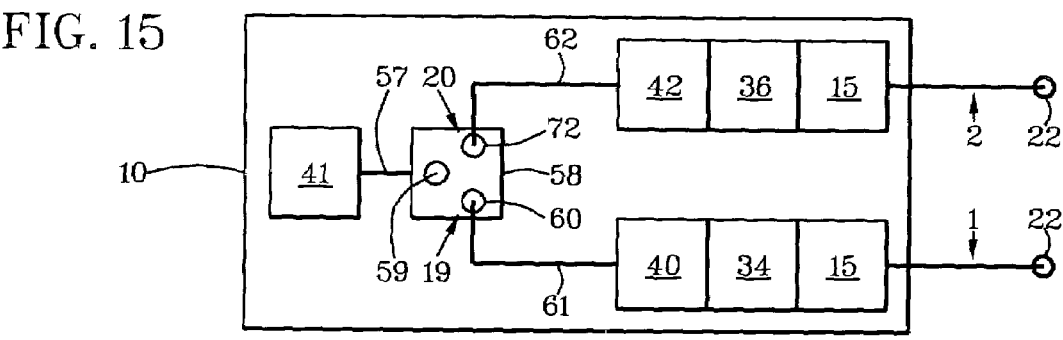
FIG. 15 is a schematic diagram of the hydraulic embodiment.

The first pivot motor 16 can include a first hydraulic motor 40 having a fluid pressurizer 41 on the police car 10. The second pivot motor 17 can include a second hydraulic motor 42 having the fluid pressurizer 41 on the police car 10. The fluid pressurizer 41 can include pressure controllability for the first hydraulic motor 40 with the first controller 19. The fluid pressurizer 41 can include pressure controllability for the second hydraulic motor 42 with the second controller 20 selectively as shown in FIGS. 11 and 15.

Figure 16:
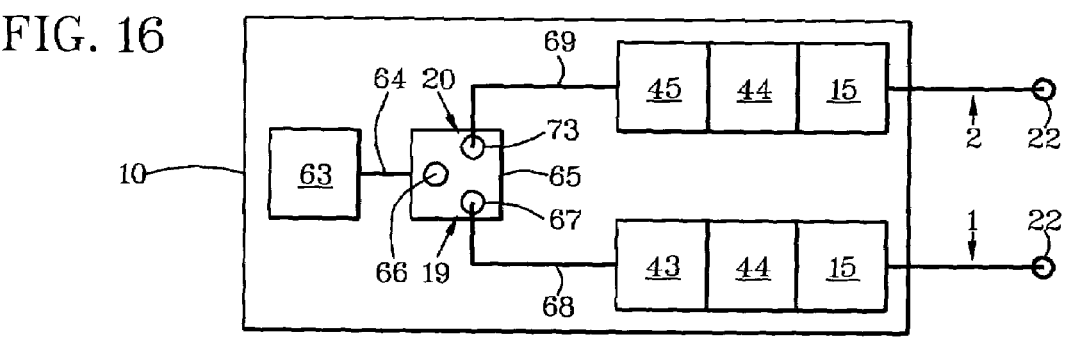
FIG. 16 is a schematic diagram of the screw-motor embodiment.

The first pivot motor 16 can include a first screw motor 43 with the first control rod being a screw shaft 44 that is screwed into the first screw motor 43. The second pivot motor 17 can include a second screw motor 45 with the second control rod being the screw shaft 44 that is screwed into the second screw motor 45 as shown in FIGS. 12 and 16. The first screw motor 43 includes directional controllability with the first controller 19 and the second screw motor 45 includes directional controllability with the second controller 20 selectively as shown in FIGS. 12 and 16.

Figure 17:
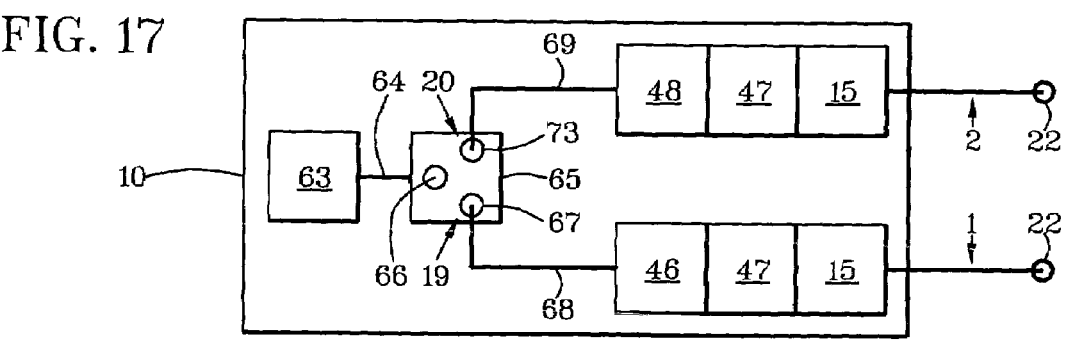
FIG. 17 is a schematic diagram of the pinion-rack embodiment.
Figure 18:
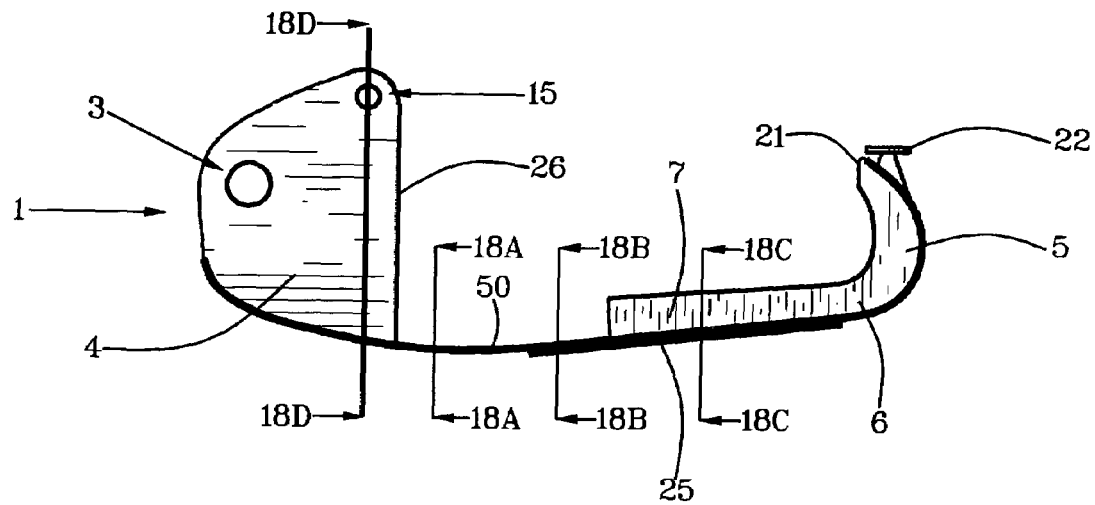
FIG. 18 is a side view of a spring-arm embodiment of the lift hook.
Figure 19:
FIG. 19 is a section view of the FIG. 18 illustration as seen through section line 18A.
Figure 20:
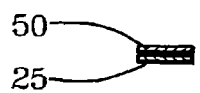
FIG. 20 is a section view of the FIG. 18 illustration as seen through section line 18B.
Figure 21:
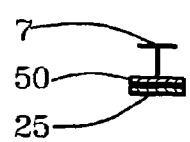
FIG. 21 is a section view of the FIG. 18 illustration as seen through section line 18C.
Figure 22:
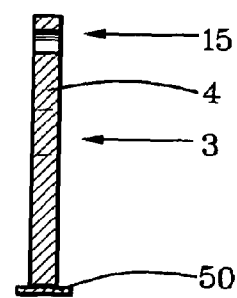
FIG. 22 is a section view of the FIG. 18 illustration as seen through section line 18D.

The first pivot motor 16 can include a first pinion motor 46 with the first control rod being a rack shaft 47 that is rack-and-pinion meshed with the first pinion motor 46. The second pivot motor 17 can include a second pinion motor 48 with the second control rod being the rack shaft 47 that is rack-and-pinion meshed with the second pinion motor 48. The first pinion motor 46 can include directional controllability electrically with the first controller 19 and the second pinion motor 48 can include directional controllability electrically with the second controller 20 selectively as shown in FIGS. 13 and 17.

Air pressure from the air pressurizer 38 is supplied through an air tube 51 to the control panel 18 that can include a pneumatic distributor 52 with a pneumatic joy stick 53 having the separate controls 19, 20 which can include a first pneumatic valve 54 from the pneumatic distributor 52 to a first pneumatic line 55 that is affixed en route to the first pneumatic motor 37 and a second pneumatic valve 49 from the pneumatic distributor 52 to a second pneumatic line 56 that is affixed en route to the second pneumatic motor 39.

Fluid pressure from the fluid pressurizer 41 is supplied through a fluid tube 57 to the control panel 18 that can include a hydraulic distributor 58 with a hydraulic joy stick 59 having the separate controls 19, 20 which can include a first hydraulic valve 60 from the hydraulic distributor 58 to a first hydraulic line 61 that is affixed en route to the first hydraulic motor 40 and a second hydraulic line 62 that is affixed en route to the second hydraulic motor 42.

The pivot motors 16, 17 can include the screw motors 43, 45 with electrical power from a power source 63 on the police car 10 through an electrical source line 64 to the control panel 18 that can include an electrical distributor 65 with an electrical joy stick 66 having the separate controls 19, 20 which can include a first resistance switch 67 from the electrical distributor 65 to a first electrical line 68 that is affixed en route to the first screw motor 43 and a second electrical line 69 that is affixed en route to the second screw motor 45.

The pivot motors 16, 17 can include the pinion motors 46, 48 with electrical power from the power source 63 on the police car 10 through the electrical source line 64 to the control panel 18 that can include the electrical distributor 65 with the electrical joy stick 66 having the separate controls 19, 20 which include the first resistance switch 67 from the electrical distributor 65 to a first electrical line 68 that is affixed en route to the first pinion motor 46 and the second electrical line 69 that is affixed en route to the second pinion motor 48.

With a police car having the police-car vehicle restraint described in claim 1, a method for restraining a target vehicle 24 with the police car 10 includes the following steps:

maintaining the lift hooks 1, 2 in a substantially vertical orientation for a non-use mode;

pivoting the lift hooks 1, 2 to a selectively horizontal orientation in preparation for restraining the target vehicle 24;

maneuvering the police car for positioning hook ends of the lift hooks under an aft portion of the target vehicle for spring-maintained lifting contact with the aft portion of the target vehicle;

pivoting the lift hooks 1, 2 upwardly for lifting the aft portion of the target vehicle 24 high enough to prevent effective traction contact of rear wheels 70 of the target vehicle 24 with a traction surface 71 for a rear-wheel-drive target vehicle 24 and for obstructing steerability while also hook-restraining a target vehicle 24 having front-wheel drive.

A new and useful police-car vehicle restraint having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A police-car vehicle restraint comprising:
a pair of two separately operable lift hooks attached pivotally to a front end of a chassis of a police car for being pivoted to proximate verticality for a non-use mode, to proximate horizontality for a use-preparation mode and towards verticality for a use mode selectively;
the pair of two separately operable lift hooks including a first lift hook and a second lift hook;
the first lift hook and the second lift hook each having a vertically pivotal spring attachment on a pivot end, a hook on a hook end and a lift arm intermediate proximate the pivot end and the hook end;
the vertically pivotal spring attachment including a flat-spring section;
a first chassis attachment attachable predeterminedly to proximate a front end of a first chassis beam of a chassis of the police car;
a second chassis attachment attachable predeterminedly to proximate a front end of a second chassis beam of a chassis of the police car;
the pivotal attachment on the first lift hook and the first chassis attachment having a predetermined first pivotal connection;
the pivotal attachment on the second lift hook and the second chassis attachment having a predetermined second pivotal connection;
the pivot end of the first lift hook having a pivot transmission that is geared to a first pivot motor;
the pivot end of the second lift hook having a pivot transmission that is geared to a second pivot motor;
a control panel that is attachable to an interior portion of the police car for convenient view and access by an operator in the police car;
the control panel having a first controller for control communication with the first pivot motor and a second controller for control communication with the second pivot motor selectively or simultaneously;
the first pivot motor and the second pivot motor each having lifting power that is transmittable intermediate the pivot transmission and the hook end of the first lift hook and the second lift hook for lifting a predetermined vehicle weight on the hook of the first lift hook and the second lift hook by pivoting of the first lift hook and pivoting of the second lift hook intermediate proximate horizontality and verticality selectively or simultaneously through the first controller and the second controller on the control panel; and
a lift surface on the hook of the first lift hook and the hook of the second lift hook.

2. The police-car vehicle restraint of claim 1 wherein:
the lift surface includes a swivel pad that is pivotal universally within predetermined limits for adjusting automatically to changeable orientation of a bottom of a target vehicle in relationship to changeable orientation of the hook of the first lift hook and the second lift hook that is caused to engage the bottom of the target vehicle by upward pivotal travel of the first lift hook and the second lift hook with pivotal action controlled with the first controller and the second controller selectively or simultaneously.

3. The police-car vehicle restraint of claim 1 wherein:
the lift arm of the first lift hook and lift arm of the second lift hook each include a push pad on a side opposite the hook for being positioned vertically in front of the police car for pushing vehicles and for absorbing impact shock in combination with the flat-spring section with the first lift hook and the second lift hook being oriented vertically in a non-use mode.

4. The police-car vehicle restraint of claim 1 wherein:
the first lift hook and the second lift hook each include an impact edge that is oriented orthogonally to axes of the lift arm on a hook side of the pivot attachment for absorbing impact of rearward travel of the target vehicle from unanticipated slowing of speed and quick stopping of the target vehicle.

5. The police-car vehicle restraint of claim 1 wherein:
the first chassis attachment includes a first attachment housing having side walls for housing a pivot axle of the first pivotal connection;
the second chassis attachment includes a second attachment housing having the side walls for housing the pivot axle of the second pivotal connection;
the first attachment housing is attachable to the first chassis beam with a first attachment rod that is extended rearwardly from the first attachment housing and attached to the first chassis beam aft of a first side of a bumper wall; and the second attachment housing is attachable to the second chassis beam with a second attachment rod that is extended rearwardly from the second attachment housing and attached to the second chassis beam aft of a second side of the bumper wall.

6. The police-car vehicle restraint of claim 1 wherein:

the pivot transmission includes a first control rod that is attached pivotally to a lever connection that is offset from the first pivotal connection on an impact edge at the pivot end;

the pivot transmission includes a second control rod that is attached pivotally to the lever connection that is offset from the second pivotal connection on an impact edge at the pivot end;

the first control rod is attached predeterminedly to the first pivot motor that is anchored to the police car proximate the first chassis beam for controlling distance of the lever connection from the first pivot motor; and the second control rod is attached predeterminedly to the second pivot motor that is anchored to the police car proximate the second chassis beam for controlling distance of the lever connection from the second pivot motor for thereby actuating the first lift hook and the second lift hook intermediate proximate verticality and horizontality selectively or simultaneously from the control panel.

7. The police-car vehicle restraint of claim 6 wherein:

the first pivot motor includes a first pneumatic motor having an air pressurizer on the police car;

the second pivot motor includes a second pneumatic motor having the air pressurizer on the police car;

the air pressurizer includes pressure controllability for the first pneumatic motor with the first controller; and the air pressurizer includes pressure controllability for the second pneumatic motor with the second controller selectively.

8. The police-car vehicle restraint of claim 6 wherein:

the first pivot motor includes a first hydraulic motor having a fluid pressurizer on the police car;

the second pivot motor includes a second hydraulic motor having the fluid pressurizer on the police car;

the fluid pressurizer includes pressure controllability for the first hydraulic motor with the first controller; and the fluid pressurizer includes pressure controllability for the second hydraulic motor with the second controller selectively.

9. The police-car vehicle restraint of claim 6 wherein:

the first pivot motor includes a first screw motor with the first control rod being a screw shaft that is screwed into the first screw motor;

the second pivot motor includes a second screw motor with the second control rod being the screw shaft that is screwed into the second screw motor;

the first screw motor includes directional controllability with the first controller; and the second screw motor includes directional controllability with the second controller selectively.

10. The police-car vehicle restraint of claim 6 wherein:

the first pivot motor includes a first pinion motor with the first control rod being a rack shaft that is rack-and-pinion meshed with the first pinion motor;

the second pivot motor includes a second pinion motor with the second control rod being the rack shaft that is rack-and-pinion meshed with the second pinion motor;

the first pinion motor includes directional controllability electrically with the first controller; and the second pinion motor includes directional controllability electrically with the second controller selectively.

11. The police-car vehicle restraint of claim 1 wherein:

the lift arm of the first lift hook and of the second lift hook each include the flat-spring section proximate the pivot end for sustaining lifting force of the hook against a bottom of an aft portion of the target vehicle and for providing shock absorbency against frontal impact with the first lift hook and the second lift hook being in a vertical non-lifting mode.

12. The police-car vehicle restraint of claim 1 and further comprising:

a spring member intermediate the first lift hook and the first chassis beam for urging the hook end of the first lift hook upwardly from horizontality for spring-pressured engagement with the bottom of the target vehicle; and, a spring member intermediate the second lift hook and the second chassis beam for urging the hook end of the second lift hook upwardly from horizontality for spring-pressured engagement with the bottom of the target vehicle.

13. The police-car vehicle restraint of claim 12 wherein:

the spring member includes the flat-spring section proximate the pivot end for sustaining lifting force of the hook against a bottom of an aft portion of the target vehicle and for providing shock absorbency against frontal impact with the first lift hook and the second lift hook being in a vertical non-lifting mode.

14. A police-car vehicle restraint comprising:

a pair of two separately operable lift hooks attached pivotally to a front end of chassis beams of the police car for being pivoted intermediate proximate verticality and proximate horizontality selectively with separate predetermined pivot motors that are operable by separate controls which are in control-power communication with the pivot motors from the control panel that is conveniently visible and accessible to an operator in the police car;

a first lift hook and a second lift hook each having a vertically pivotal spring attachment on a pivot end, a hook on a hook end and a lift arm intermediate proximate the pivot end and the hook end;

the vertically pivotal spring attachment including a flat-spring section; and the pivot motors each having predetermined lifting power that is transmittable intermediate the pivot transmission and the hook ends of the lift hooks for lifting the target vehicle weight on the lift hooks by pivoting the lift hooks intermediate proximate horizontality and verticality selectively or simultaneously through a first controller and a second controller on the control panel.

15. The police-car vehicle restraint of claim 14 wherein:

the pivot motors include pneumatic motors with air pressure from the air pressurizer through an air tube to the control panel that includes a pneumatic distributor with a pneumatic joy stick having the separate controls which include a first pneumatic valve from the pneumatic distributor to a first pneumatic line that is affixed en route to the first pneumatic motor and a second pneumatic valve from the pneumatic distributor to a second pneumatic line that is affixed en route to the second pneumatic motor.

16. The police-car vehicle restraint of claim 14 wherein:

the pivot motors include hydraulic motors with fluid pressure from the fluid pressurizer through a fluid tube to the control panel that includes a hydraulic distributor with a hydraulic joy stick having the separate controls which include a first hydraulic valve from the hydraulic distributor to a first hydraulic line that is affixed en route to the first hydraulic motor and a second hydraulic valve from the hydraulic distributor to a second hydraulic line that is affixed en route to the second hydraulic motor.

17. The police-car vehicle restraint of claim 14 wherein: the pivot motors include screw motors with electrical power from a power source on the police car through an electrical source line to the control panel that includes an electrical distributor with an electrical joy stick having the separate controls which include a first resistance switch from the electrical distributor to a first electrical line that is affixed en route to the first screw motor and a second resistance switch from the electrical distributor to a second electrical line that is affixed en route to the second screw motor.

18. The police-car vehicle restraint of claim 14 wherein: the pivot motors include pinion motors with electrical power from the power source on the police car through the electrical source line to the control panel that includes the electrical distributor with the electrical joy stick having the separate controls which include the first resistance switch from the electrical distributor to the first electrical line that is affixed en route to the first pinion motor and the second resistance switch from the electrical distributor to the second electrical line that is affixed en route to the second pinion motor.

19. A method for restraining a target vehicle with a police car having the police-car vehicle restraint of claim 1;
   the method comprising the following steps:
   maintaining the lift hooks in a substantially vertical orientation for a resilient push mode;
   pivoting the lift hooks to a selectively horizontal orientation in preparation for restraining the target vehicle;
   maneuvering the police car for positioning hook ends of the lift hooks under an aft portion of the target vehicle; and
   pivoting the lift hooks upwardly for lifting the aft portion of the target vehicle high enough to prevent traction contact of rear wheels of the target vehicle with a traction surface for a rear-wheel-drive target vehicle and for obstructing steerability while also hook-restraining a target vehicle having front-wheel drive for spring-maintained lifting contact with the aft portion of the target vehicle.

* * * * *